US009423279B2

(12) United States Patent
Yoshida et al.

(10) Patent No.: US 9,423,279 B2
(45) Date of Patent: Aug. 23, 2016

(54) ENCODER, MOTOR WITH ENCODER, AND SERVO SYSTEM

(71) Applicant: KABUSHIKI KAISHA YASKAWA DENKI, Kitakyushu-shi (JP)

(72) Inventors: Yasushi Yoshida, Kitakyushu (JP); Yasuhiro Matsutani, Kitakyushu (JP); Shiro Yoshidomi, Kitakyushu (JP); Hiroshi Takada, Kitakyushu (JP); Yuji Arinaga, Kitakyushu (JP); Ikuma Murokita, Kitakyushu (JP); Masanobu Harada, Kitakyushu (JP); Hiroki Kondo, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/526,535

(22) Filed: Oct. 29, 2014

(65) Prior Publication Data
US 2015/0123585 A1 May 7, 2015

(30) Foreign Application Priority Data
Nov. 5, 2013 (JP) .................................. 2013-229842

(51) Int. Cl.
*G01R 31/02* (2006.01)
*G01D 5/347* (2006.01)
(Continued)

(52) U.S. Cl.
CPC .......... *G01D 5/3473* (2013.01); *G01D 5/2458* (2013.01); *G01D 5/34792* (2013.01); *G05B 1/04* (2013.01)

(58) Field of Classification Search
CPC ........... G01D 5/3476; H02K 11/0026; G05B 2219/37104; G05B 1/04
See application file for complete search history.

(56) References Cited

U.S. PATENT DOCUMENTS 4,725,723 A 2/1988 Shimojima
4,767,954 A * 8/1988 Phillips ................ H02K 41/031
              310/12.21

(Continued)

FOREIGN PATENT DOCUMENTS

CN 103210284   7/2013
EP 2487464 A2  8/2012

(Continued)

OTHER PUBLICATIONS

Office Action (Search Report and Written Opinion) for the corresponding Singapore Patent Application No. 10201407181Q issued Feb. 5, 2015.

(Continued)

*Primary Examiner* — Karen Masih
(74) *Attorney, Agent, or Firm* — Mori & Ward, LLP

(57) ABSTRACT

An optical module includes: a light source configured to emit diffusion light to tracks; one light receiving array and another light receiving array which are arranged across the light source in a width direction substantially vertical to the measurement direction; a light receiving array arranged between the one light receiving array and the light source, and configured to receive light which is reflected at the tracks having a first incremental pattern; and a light receiving array arranged between the another first light receiving array and the light source, and configured to receive light which is reflected at the tracks having a second incremental pattern which pitch is longer than a pitch of the first incremental pattern.

12 Claims, 11 Drawing Sheets

(51) Int. Cl.
*G05B 1/04* (2006.01)
*G01D 5/245* (2006.01)

(56) References Cited

U.S. PATENT DOCUMENTS

| | | |
|---|---|---|
| 2010/0224768 A1 | 9/2010 | Yoshida et al. |
| 2014/0132124 A1 | 5/2014 | Yoshida et al. |

FOREIGN PATENT DOCUMENTS

| | | |
|---|---|---|
| EP | 2639558 | 9/2013 |
| JP | 2005-121593 | 5/2005 |
| JP | 2008-116343 | 5/2008 |
| JP | 2010-066272 | 3/2010 |
| JP | 2012-103032 | 5/2012 |
| JP | 2012-108159 | 6/2012 |
| WO | WO 2008/056546 | 5/2008 |
| WO | WO 2011/048191 | 4/2011 |
| WO | WO 2013/014721 | 1/2013 |

OTHER PUBLICATIONS

Extended European Search Report for corresponding EP Application No. 14190809.5-1558, Apr. 10, 2015.
Chinese Office Action for corresponding CN Application No. 201410637563.1, Jun. 24, 2016.

* cited by examiner

ENCODER, MOTOR WITH ENCODER, AND SERVO SYSTEM

INCORPORATION BY REFERENCE

The present disclosure contains subject matter related to that disclosed in Japanese Priority Patent Application JP 2013-229842 filed in the Japan Patent Office on Nov. 5, 2013, the entire contents of which are hereby incorporated by reference.

BACKGROUND

1. Field of the Invention

The embodiments disclosed herein relates to an encoder, a motor with the encoder, and a servo system.

2. Description of the Related Art

JP 2012-103032 A discloses a reflective type encoder which includes incremental light receiving element groups which are separately arranged across a light source in a circumferential direction of a rotating disk and absolute light receiving element groups which are arranged on at least one of the outside and inside of the light source in a radial direction of the rotating disk.

In recent years, as the performance of a servo system has been increased, a higher resolution of a reflective type encoder has been also desired.

SUMMARY

A one aspect of the present invention is summarized as an encoder including: tracks respectively having reflectors arranged along a measurement direction; a point light source configured to emit diffusion light to the tracks; one first light receiving array and another first light receiving array which are arranged across the point light source in a width direction substantially vertical to the measurement direction; a second light receiving array arranged between the one first light receiving array and the point light source, and configured to receive light which is reflected at the tracks having a first incremental pattern; and a third light receiving array arranged between the another first light receiving array and the point light source, and configured to receive light which is reflected at the tracks having a second incremental pattern which pitch is longer than a pitch of the first incremental pattern.

An another aspect of the present invention is summarized as a motor with the encoder including: a linear motor in which a movable element moves with respect to an stator, or a rotary motor in which a rotor moves with respect to an stator; and the encoder configured to detect at least one of a position and a speed of the movable element or the rotor.

An another aspect of the present invention is summarized as a servo system including: a linear motor in which a movable element moves with respect to an stator, or a rotary motor in which a rotor moves with respect to an stator; the encoder configured to detect at least one of a position and a speed of the movable element or the rotor; and a controller configured to control the linear motor or the rotary motor based on a result detected by the encoder.

DESCRIPTION OF THE EMBODIMENTS

Hereinafter, an embodiment of the disclosure will be described with reference to the drawings.

Furthermore, an encoder according to the embodiment to be described below is applicable to various types of encoders such as a rotary type and a linear type. A rotary-type encoder will be described below as an example for easier understanding. In the case of applying to another type of encoder, it is possible to appropriately change an object to be measured from a rotary-type disk to a linear-type linear scale, and thus the detailed description thereof will not be presented.

<1. Servo System>

Figure 1:
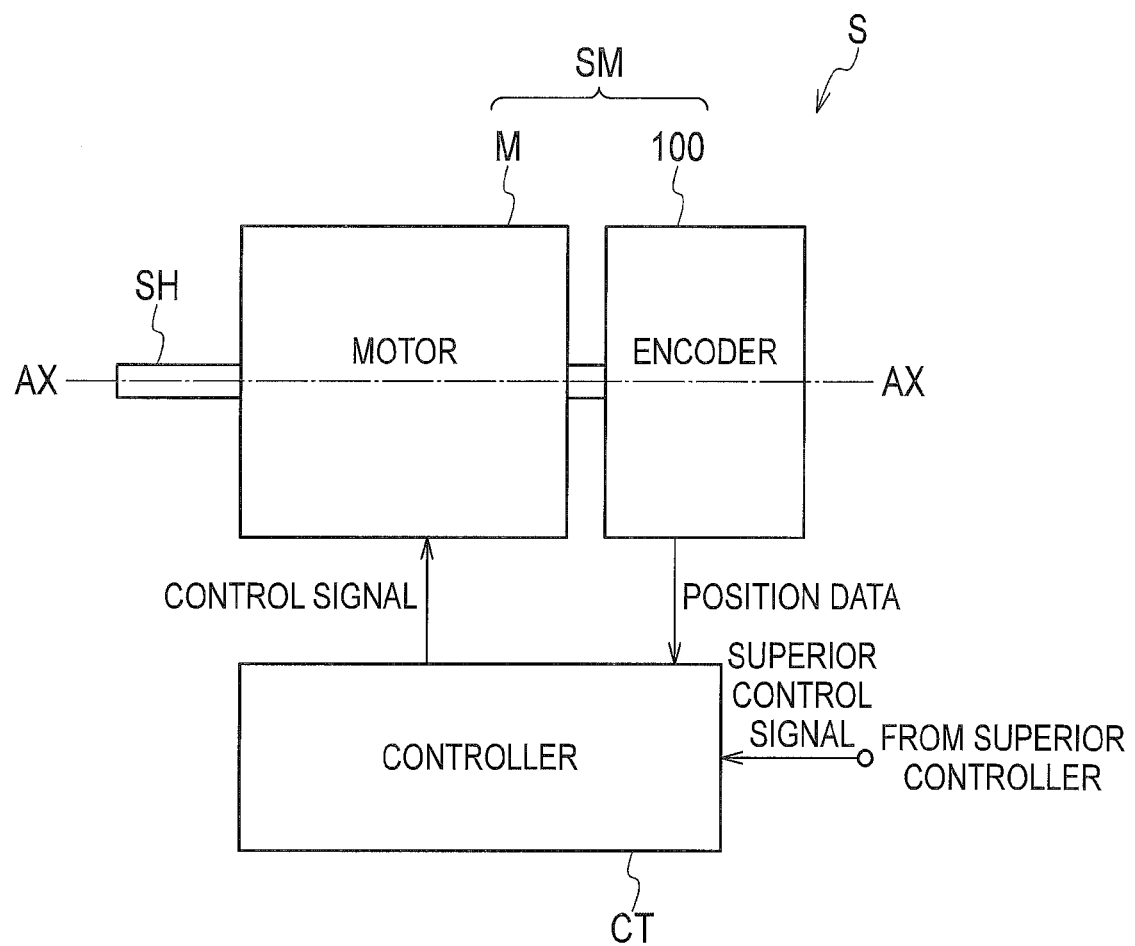
FIG. 1 is an explanatory diagram illustrating a servo system according to an embodiment.

First, a configuration of a servo system according to this embodiment will be described with reference to FIG. 1. As illustrated in FIG. 1, a servo system S includes a servo motor SM and a controller CT. The servo motor SM includes an encoder 100 and a motor M.

The motor M is an example of a power generation source not including the encoder 100. The motor M is a rotary-type motor in which a rotor (not illustrated) rotates with respect to a stator (not illustrated) and outputs a rotational force by allowing a shaft SH fixed to the rotor to be rotated around a shaft center AX.

Further, the motor M alone may be referred to as a servo motor, but the configuration including the encoder 100 and the motor M is referred to as the servo motor SM in this embodiment. That is, the servo motor SM corresponds to an example of a motor with an encoder. A case where the motor with the encoder is a servo motor which is controlled to follow a target value of a position, a speed or the like, is described below for convenience of description, but the motor with the encoder is not necessarily limited to the servo motor. For example, the motor with the encoder is also intended to include a motor used in those other than the servo system, for instance, when the encoder is used only to display output, as long as the encoder is attached.

Further, the motor M is not limited in particular, for instance, as long as position data thereof can be detected by the encoder 100. Further, the motor M is not limited to an electric motor that uses electricity as a power source, but may be a motor that uses, for example, another power source, such as a hydraulic motor, an air motor, or a steam motor. However, a case where the motor M is the electric motor will be described for convenience of description.

The encoder 100 is connected to a side opposite to an output side of the rotational force of the shaft SH of the motor M, but is not necessarily limited to the opposite side. The encoder 100 may be connected to output side of the rotational force of the shaft SH. The encoder 100 detects a position (referred to also as a rotation angle) of the motor M by detecting the position of the shaft SH (rotor) and outputs position data representing the position of the motor M.

The encoder 100 may detect at least one of a speed (referred to also as a rotation speed, an angular speed, and the like) of the motor M and an acceleration (referred to also as rotation acceleration, angular acceleration, and the like) of the motor M in addition to or in place of the position of the motor M. In this case, it is possible to detect the speed and the acceleration of the motor M by, for example, processing such as a first or second order differential of the position with respect to time or a count of a detection signal (for example, an incremental signal, to be described below) for a predetermined period of time. For convenience of description, a physical quantity detected by the encoder 100 will be described as the position in the following.

The controller CT acquires position data output from the encoder 100 and controls the rotation of the motor M based on the acquired position data. Therefore, in this embodiment in which an electric motor is used as the motor M, the controller CT controls a current or voltage to be applied to the motor M based on the position data, and thereby controls the rotation of the motor M. Further, the controller CT can also acquire a superior control signal from a superior controller (not illustrated), and control the motor M such that a rotational force capable of realizing a position or the like represented by the superior control signal is output from the shaft SH of the motor M. Furthermore, when the motor M uses another power source, such as a hydraulic power source, an air power source, or a steam power source, the controller CT can control the rotation of the motor M by controlling the supply from such a power sources.

<2. Encoder>

Figure 2:
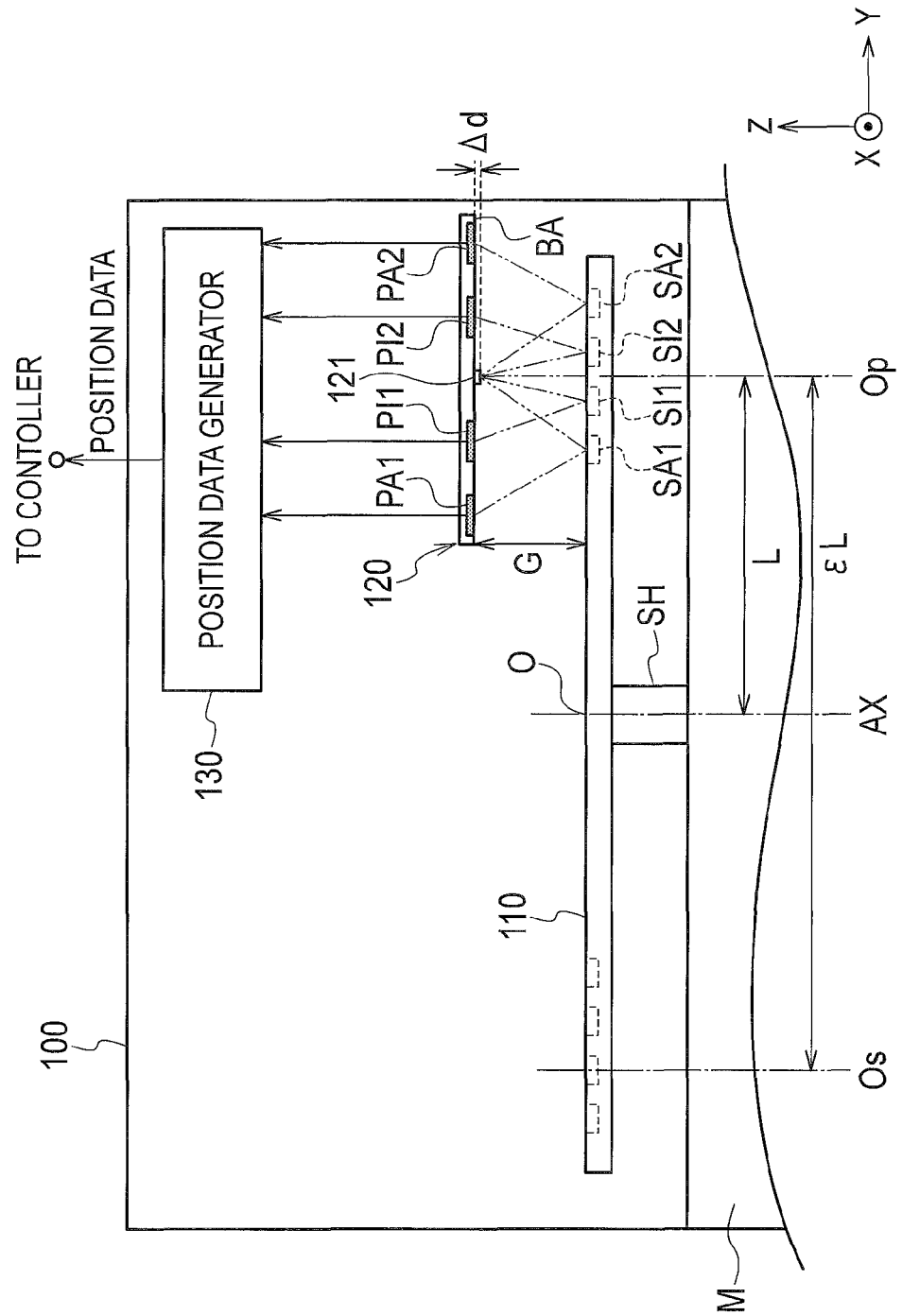
FIG. 2 is an explanatory diagram illustrating an encoder according to the embodiment.

Next, the encoder 100 according to this embodiment will be described below. As illustrated in FIG. 2, the encoder 100 has a disk 110, an optical module 120, and a position data generator 130.

Here, for convenience of description of a structure of the encoder 100, an upward-downward direction is defined and appropriately used as follows. In FIG. 2, a direction in which the disk 110 faces the optical module 120, that is, a positive direction along the Z axis is referred to as an "upward" direction and a negative direction along the Z axis is referred to as a "downward" direction. However, the direction is changed depending on installation aspects of the encoder 100, and thus does not limit a positional relation of each component of the encoder 100.

(2-1. Disk)

Figure 3:
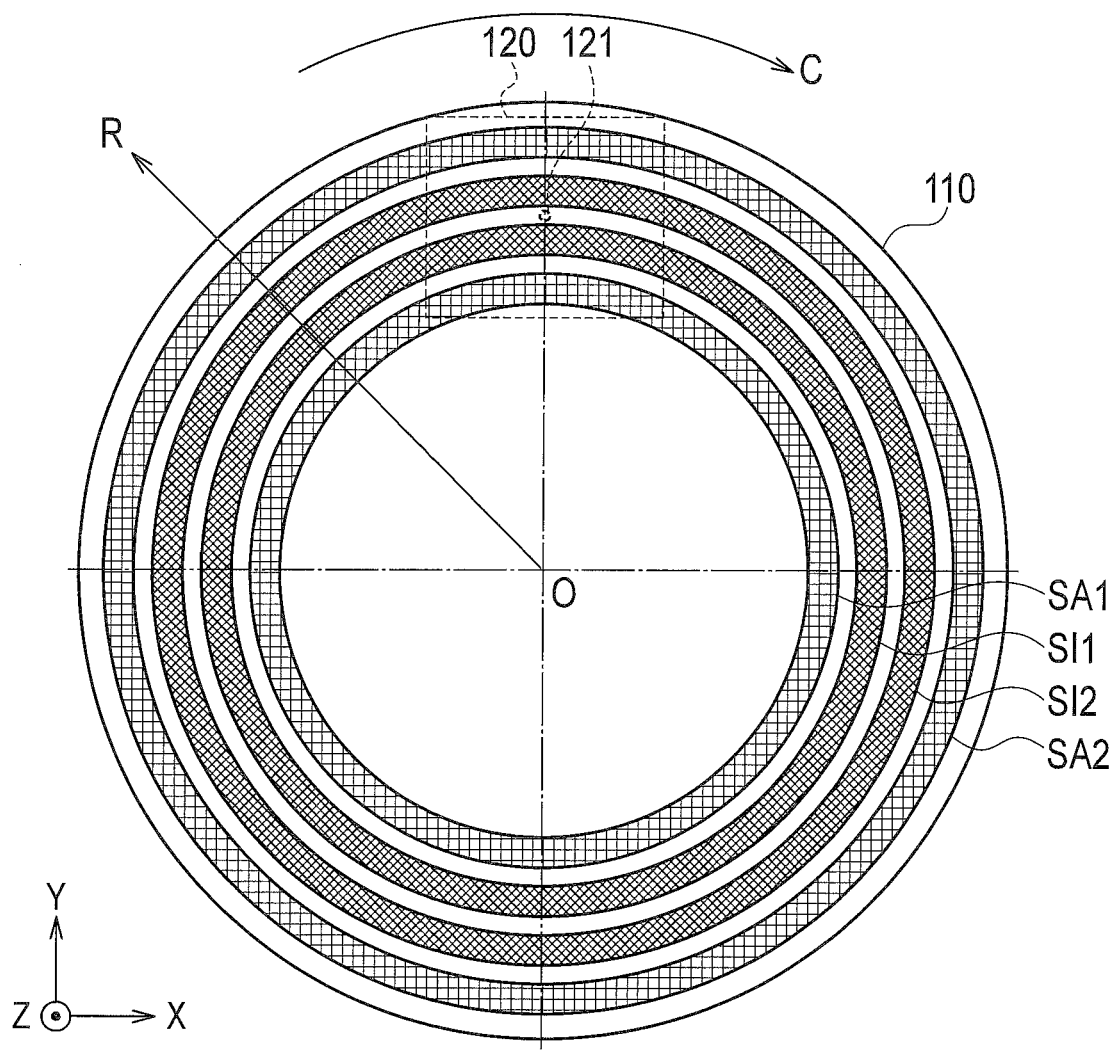
FIG. 3 is an explanatory diagram illustrating a disk according to the embodiment.

The disk 110 is formed into a circular-plate shape as illustrated in FIG. 3 and arranged so that a disk center O thereof substantially coincides with the shaft center AX. The disk 110 is connected to the shaft SH of the motor M and is rotated by the rotation of the shaft SH. In this embodiment, as an object to be measured, in which the rotation of the motor M is measured, the disk 110 of the circular-plate shape is described as an example. However, it is also possible to use another member, for example, such as an end face of the shaft SH, as the object to be measured. In addition, the disk 110 is directly connected to the shaft SH in an example illustrated in FIG. 2, but may be connected to the shaft SH through a connection member such as a hub.

As illustrated in FIG. 3, the disk 110 has a plurality of tracks SA1, SA2, SI1, and SI2. The disk 110 rotates as the motor M is driven, but the optical module 120 is fixedly arranged while being opposite to a part of the disk 110. Accordingly, as the motor M is driven, the tracks SA1, SA2, SI1, and SI2 and the optical module 120 relatively move with respect to each other in a measurement direction (that is, a direction of the arrow C illustrated in FIG. 3 and appropriately described below as a "measurement direction C").

Here, the "measurement direction" refers to a measurement direction when each of the tracks formed on the disk 110 is optically measured by the optical module 120. As in this embodiment, in the rotary-type encoder where the object to be measured is the disk 110, the measurement direction coincides with a circumferential direction centering a central axis of the disk 110. However, for example, in the linear-type encoder in which the object to be measured is a linear scale and a movable element moves with respect to a stator, the measurement direction refers to a direction along the linear scale. Further, the "central axis" refers to the center of a rotational axis of the disk 110 and coincides with the shaft center AX of the shaft SH when the disk 110 and the shaft SH are coaxially connected to each other.

(2-2. Optical Detection Mechanism)

An optical detection mechanism has the tracks SA1, SA2, SI1, and SI2 and the optical module 120. Each of the tracks is formed as a track arranged on the top surface of the disk 110 in the shape of ring centering the disk center O. Each of the tracks has a plurality of reflectors (parts hatched by oblique lines in FIG. 4) arranged in the measurement direction C over the entire circumference of the track. Each of the reflectors is configured to reflect light irradiated from a light source 121. The reflector can be called as a "slit (reflect slit)", because the light reflected at the reflector travels a predetermined direction without obstructing the path of the light. Moreover, a plurality of reflectors can be a grid as a whole.

(2-2-1. Disk)

For example, the disk 110 is formed of a material such as a metal which reflects light. Then, a material having a low reflectance (for example, chromium oxide) is applied to and arranged at parts of the surface of the disk 110, which reflects no light, and thus the reflectors are formed at parts at which the material is not arranged. Further, the parts in which the light is not reflected are turned into a rough surface by, for example, sputtering and are reduced in the reflectance. Thereby, the reflectors may be formed at the parts.

Further, the material of the disk 110 and a manufacturing method thereof are not limited in particular. For example, the disk 110 can be formed of light transmitting materials such as a glass or a transparent resin. In this case, a light reflecting material (for example, aluminum) is arranged on the surface of the disk 110 by, for example, deposition, and thus the reflectors can be formed.

Four tracks are juxtaposed in a width direction (a direction of the arrow R illustrated in FIG. 3 and is appropriately described below as a "width direction R".), on the top surface of the disk 110. Further, the "width direction" refers to a radial direction of the disk 110, that is, a direction substantially perpendicular to the measurement direction C. A length of each track in the width direction R corresponds to a width of each track. The four tracks are concentrically arranged in order of SA1, SI1, SI2, and SA2 from inside to outside in the width direction R. In order to describe each track in more detail, a partially enlarged view of a surrounding area opposite to the optical module 120 of the disk 110 is illustrated in FIG. 4.

Figure 4:
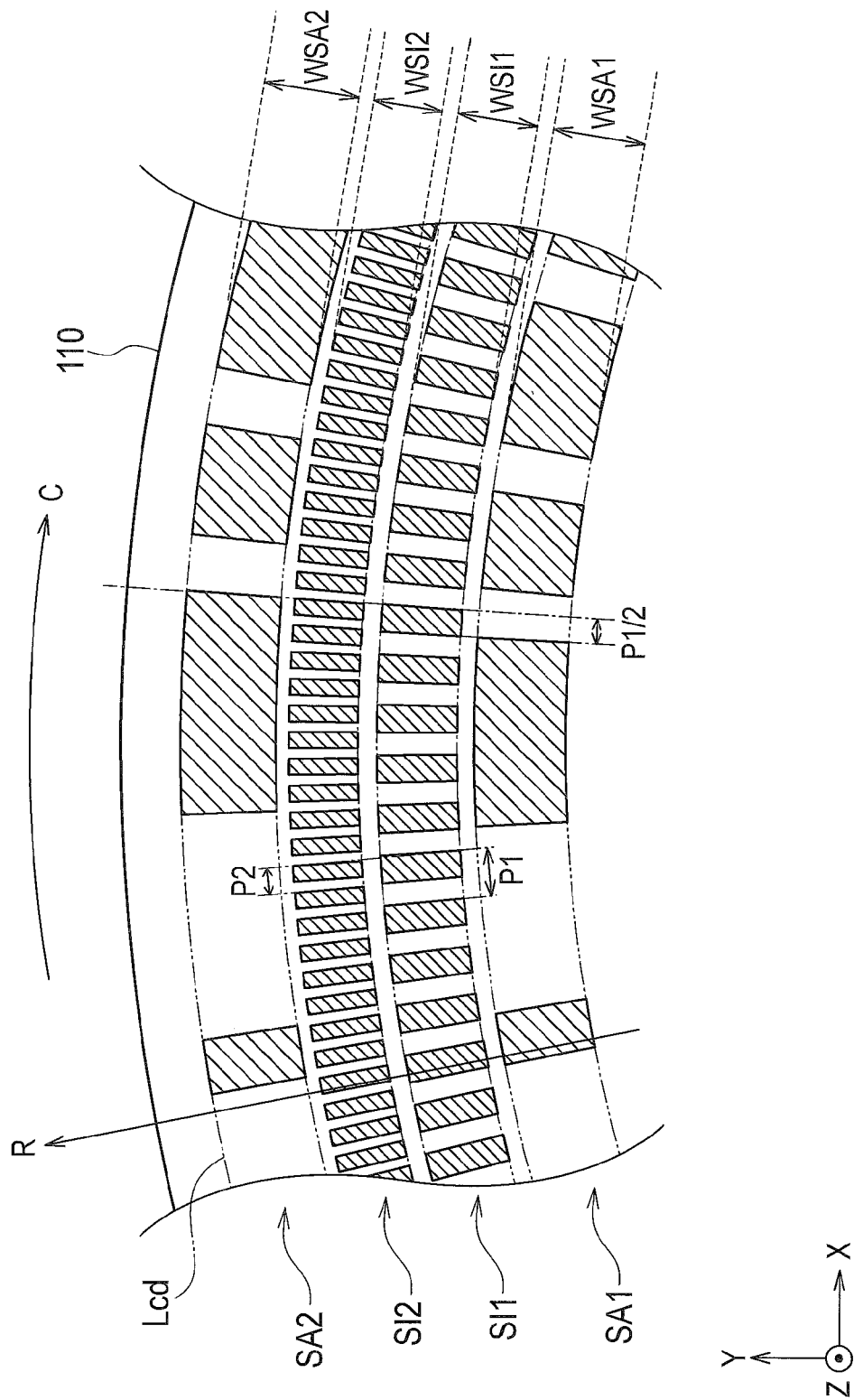
FIG. 4 is an explanatory diagram illustrating a track according to the embodiment.

As illustrated in FIG. 4, the plurality of reflectors provided for the tracks SA1 and SA2 can be arranged on the entire circumference of the disk 110 so as to have an absolute pattern in the measurement direction C.

Furthermore, the "absolute pattern" is a pattern in which positions, proportion or the like of the reflectors in an opposing angle of light receiving arrays provided in the optical module 120, to be described below, are determined uniquely within one rotation of the disk 110. That is, for example, in the case of an example of the absolute pattern illustrated in FIG. 4, when the motor M is located at a certain angular position, a combination of bit patterns by detection or non-detection of each of the plurality of light receiving elements of the light receiving arrays facing each other uniquely can represent the absolute position of the angular position. Further, the "absolute position" refers to an angular position relative to an original point within one rotation of the disk 110. The original point is set to an appropriate angular position within one rotation of the disk 110, and the absolute pattern is formed on the basis of the original point.

Furthermore, according to an example of this pattern, it is possible to generate a pattern which one-dimensionally represents the absolute position of the motor M by bits in the number of light receiving elements of the light receiving array. However, the absolute pattern is not limited to this example. For example, it may be a pattern which is multi-dimensionally represented by the bits in the number of the light receiving elements. Further, in addition to the predetermined bit pattern, it may be also a pattern in which physical quantities such as the amount or phase of light received at the light receiving element varies to uniquely represent the absolute position, a pattern in which a code sequence of the absolute pattern is subjected to modulation processing, or other variety of patterns.

Further, in this embodiment, the same absolute patterns are offset from each other by, for example, a half of the length of the one bit in the measurement direction C, and are formed as the two tracks SA1 and SA2. The amount of offset is equivalent to, for example, a half of a pitch P1 of the reflector of the track SI1. Supposing that the tracks SA1 and SA2 are not configured to be offset, there is a possibility as follows. That is, when the absolute position is represented by one-dimensional absolute pattern as in this embodiment, the light receiving elements of the light receiving arrays PA1 and PA2 are located so as to be opposite to each other in the vicinity of the end of the reflector, and thus detection accuracy of the absolute position may be reduced in a change area of the bit pattern. In this embodiment, since the tracks SA1 and SA2 are offset, for example, when the absolute position by the track SA1 corresponds to the change of the bit pattern, the absolute position is calculated using a detection signal from the track SA2 or a reverse operation is performed, and thus the detection accuracy of the absolute position can be improved. Further, in the case of this configuration, it is necessary to make an amount of light received at two light receiving arrays PA1 and PA2 uniform. However, in this embodiment, the two light receiving arrays PA1 and PA2 are arranged at a position having a substantially equal distance from the light source 121, and thus it is possible to realize the above configuration.

Furthermore, instead of offsetting the respective absolute patterns of the tracks SA1 and SA2, it may be possible to offset the light receiving arrays PA1 and PA2 corresponding to the respective tracks SA1 and SA2 in the measurement direction C without offsetting the absolute patterns, for example.

On the other hand, the plurality of reflectors provided in the tracks SI1 and SI2 are arranged over the entire circumference of the disk 110 so as to have an incremental pattern in the measurement direction C.

The "incremental pattern" refers to a pattern repeated regularly at a predetermined pitch as illustrated in FIG. 4. Here, the "pitch" refers to an arrangement interval of each reflector in the tracks SI1 and SI2 having the incremental pattern. As illustrated in FIG. 4, the pitch of the track SI1 is P1, and the pitch of the track SI2 is P2. Unlike the absolute pattern which represents the absolute position as the bits corresponding to whether or not detected by the plurality of light receiving elements, the incremental pattern represents the position of the motor M for each pitch or within one pitch by the sum of detection signals of at least one or more light receiving elements. Accordingly, the incremental pattern does not represent the absolute position of the motor M, but can represent the position with very high accuracy compared to the absolute pattern.

In this embodiment, the pitch P1 of the track SI1 is set to be longer than the pitch P2 of the track SI2. In this embodiment, each pitch is set such that the relation of P1=2×P2 is satisfied. That is, the number of reflectors of the track SI2 has become twice as many as the number of reflectors of the track SI1. However, the relation of the pitch of the tracks is not limited to this example, but may obtain various values of three times, four times, five times or the like, for example.

In this embodiment, furthermore, a minimum length of the reflector of the tracks SA1 and SA2 in the measurement direction C coincides with the pitch P1 of the reflector of the track SI1. As a result, a resolution of the absolute signal based on the tracks SA1 and SA2 coincides with the number of reflectors of the track SI1. However, the minimum length is not limited to this example, and the number of reflectors of the track SI1 is preferably set to be equal to or more than the resolution of the absolute signal.

(2-2-2. Optical Module)

Figure 5:
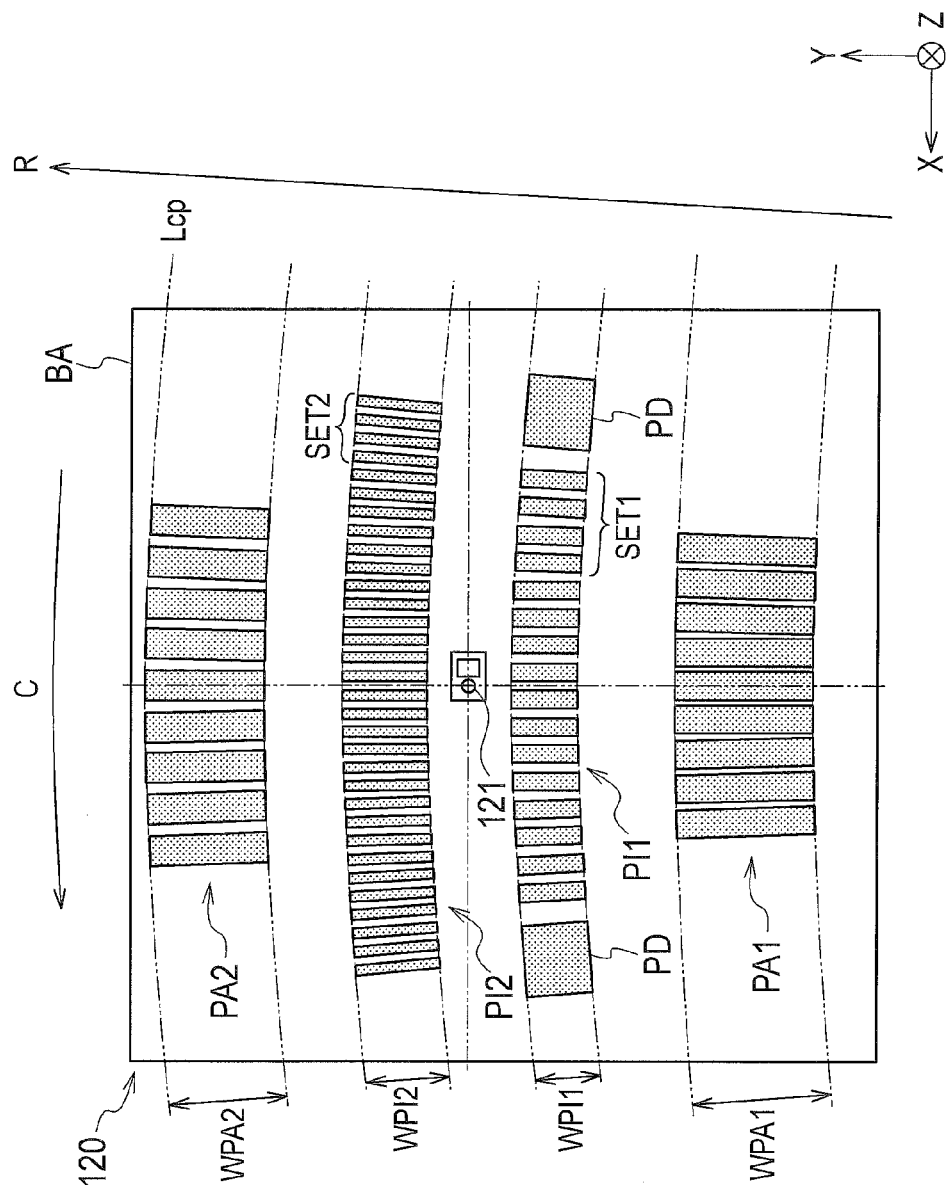
FIG. 5 is an explanatory diagram illustrating an optical module and a light receiving array according to the embodiment.

As illustrated in FIGS. 2 and 5, the optical module 120 is formed as one substrate BA parallel to the disk 110. Thus, the encoder 100 can become thinner or the optical module 120 can be easily manufactured. Therefore, as the disk 110 rotates, the optical module 120 relatively moves in the measurement direction C with respect to the tracks SA1, SA2, SI1, and SI2. Further, the optical module 120 is not necessarily configured as one substrate BA, but each component may be configured as plural substrates. In this case, these substrates may be collectively arranged. In addition, the optical module 120 may be not configured in the form of substrate.

As illustrated in FIGS. 2 and 5, the optical module 120 includes the light source 121 and the plurality of light receiving arrays PA1, PA2, PI1, and PI2 provided on the surface of the substrate BA, which faces the disk 110.

As illustrated in FIG. 3, the light source 121 is arranged at a position facing a position between the track SI1 and the track SI2 on a surface facing the disk 110 of the substrate BA. Then, the light source 121 emits light to four tracks SA1, SA2, SI1, and SI2 passing through positions facing the optical module 120 on a surface facing the substrate BA of the disk 110.

The light source 121 is not limited in particular as long as it is a light source capable of irradiating an irradiation area with light. For example, it is possible to use a light emitting diode (LED). The light source 121 is particularly configured as a point light source in which no optical lens or the like is arranged and emits diffusion light from a light emitting unit. Further, when referring to a "point light source", the light source does not need to be strictly a point. Light may be emitted from a finite light emission surface as long as the light source is regarded as a light source capable of emitting diffusion light from substantially a point-like position from the standpoint of design and operation principle. In addition, the "diffusion light" is not limited to light emitted toward all orientations from the point light source, but includes light emitted while diffusing toward a finitely certain orientation. That is, the diffusion light described herein includes light having higher diffusivity than parallel light. By using the point light source as described above, it is possible for the light source 121 to substantially uniformly irradiate the four tracks SA1, SA2, SI1, and SI2 passing through the positions facing the optical module 120 on a surface facing the substrate BA of the disk 110. Further, in the embodiment, since the light is not collected and diffused by the optical element, errors or the like hardy occurs due to the optical element, and thus it is possible to improve straightness of light toward the tracks.

The plurality of light receiving arrays PA1, PA2, PI1, and PI2 are arranged around the light source 121 and include a plurality light receiving elements (hatched portions in FIG. 5) for respectively receiving light reflected at the reflectors of the tracks corresponding thereto. As illustrated in FIG. 5, the plurality of light receiving elements are arranged along the measurement direction C.

The light emitted from the light source 121 is diffusion light. Accordingly, an image of the track projected onto the optical module 120 is an image magnified by a predetermined magnification percentage $\epsilon$ according to an optical path length. That is, as illustrated in FIGS. 4 and 5, when it is assumed that respective lengths of the tracks SA1, SA2, SI1, and SI2 in the width direction R are WSA1, WSA2, WSI1, and WSI2 and lengths of the shapes of the reflected light projected onto the optical module 120 in the width direction R are WPA1, WPA2, WPI1, and WPI2, the WPA1, WPA2, WPI1, and WPI2 become $\epsilon$ times WSA1, WSA2, WSI1, and WSI2. In this embodiment, as illustrated in FIG. 5, the respective lengths of the light receiving elements of the light receiving arrays in the width direction R are set to be substantially equal to the respective shapes of the reflectors projected onto the optical module 120 as an example. However, the length of the light receiving element in the width direction R is not necessarily limited to this example. For example, the respective lengths of the light receiving elements in the width direction R may be different from each other with respect to the light receiving arrays PA1 and PA2.

Similarly, the shape of the measurement direction C in the optical module 120 is also a shape in which the measurement direction C in the disk 110 is projected onto the optical module 120, that is, a shape affected by the magnification percentage $\epsilon$. In order to make understanding easier, as illustrated in FIG. 2, the measurement direction C at the position of the light source 121 is described in detail as an example. The measurement direction C in the disk 110 is a circular shape centering the shaft center AX. In contrast to this, the center of the measurement direction C projected onto the optical module 120 is located at a position separated from an optical center Op, which is located within the plane of the disk 110 on which the light source 121 is arranged, by a distance $\epsilon L$. The distance $\epsilon L$ is a distance L between the shaft center AX and the optical center Op magnified by the magnification percentage $\epsilon$. This position is conceptually illustrated as a measurement center Os in FIG. 2. Accordingly, the measurement direction C in the optical module 120 is on a line that centers on the measurement center Os, which is separated from the optical center Op by the distance $\epsilon L$ in the direction of the shaft center AX on a line on which the optical center Op and the shaft center AX are located, and that takes the distance $\epsilon L$ as a radius.

In FIGS. 4 and 5, respective correspondence relations of the measurement direction C in the disk 110 and the optical module 120 are represented by arc-like lines Lcd and Lcp. The line Lcd illustrated in FIG. 4 represents a line running in the measurement direction C on the disk 110, whereas the line Lcp illustrated in FIG. 5 represents a line (a line by which the line Lcd is projected onto the optical module 120) running in the measurement direction C on the substrate BA.

As illustrated in FIG. 2, when it is assumed that a gap length between the optical module 120 and the disk 110 is G and that an amount of protrusion of the light source 121 from the substrate BA is $\Delta d$, the magnification percentage $\epsilon$ is expressed as follows (Formula 1).

$$\epsilon = (2G - \Delta d)/(G - \Delta d) \qquad \text{(Formula 1)}$$

For example, a photodiode may be used as each light receiving element. However, the light receiving element is not limited to the photodiode. That is, the light receiving element is not particularly limited as long as it can receive the light emitted from the light source 121 and convert the received light into an electric signal.

In the present embodiment, the light receiving arrays are arranged corresponding to the four tracks SA1, SA2, SI1, and SI2. The light receiving array PA1 is configured to receive light reflected by the track SA1, and the light receiving array PA2 is configured to receive light reflected by the track SA2. In addition, the light receiving array PI1 is configured to receive light reflected by the track SI1, and the light receiving array PI2 is configured to receive light reflected by the track SI2.

The light source 121, the light receiving arrays PA1 and PA2, and the light receiving arrays PI1 and PI2 are arranged in a positional relation illustrated in FIG. 5. The light receiving arrays PA1 and PA2 corresponding to the absolute patterns are arranged across the light source 121 in the width direction R. In this example, the light receiving array PA1 is arranged at an inner circumferential side, and the light receiving array PA2 is arranged at an outer circumferential side. In the present embodiment, a distance between the light source 121 and the light receiving array PA1 is approximately equal to that between the light source 121 and the light receiving array PA2. That is, the light receiving arrays PA1 and PA2 (excluding a bent shape centering on the measurement center Os) are basically formed in the shape of line symmetry using the line on the width direction R passing through the light source 121 and the line on the measurement direction C as an axis of symmetry. Then, the plurality of light receiving elements provided for the light receiving arrays PA1 and PA2 are respectively arranged in the measurement directions C (along the lines Lcp) at a fixed pitch. The light receiving arrays PA1 and PA2 receive the light reflected from the respective tracks SA1 and SA2, and thus the absolute signal having the bit pattern corresponding to the number of light receiving elements is generated. Further, the light receiving arrays PA1 and PA2 correspond to an example of a first light receiving array.

The light receiving array PI1 corresponding to the incremental pattern can be arranged between the light receiving array PA1 (an example of the first light receiving array located at the other side) and the light source 121. In addition, the light receiving array PI2 corresponding to the incremental pattern can be arranged between the light receiving array PA2 (an example of the first light receiving array located at one side) and the light source 121. The light receiving array PI1 can be arranged on a side closer to the central axis than the light receiving array PI2. In addition, the distance between the light source 121 and the light receiving array PI1 is approximately equal to that between the light source 121 and the light receiving array PI2. That is, the light receiving arrays PI1 and PI2 (excluding a bent shape centering the measurement center Os) are basically formed in line symmetry using the line on the width direction R passing through the light source 121 and the line on the measurement direction C as an axis of symmetry. Further, the light receiving arrays PI2 corresponds to an example of a second light receiving array, and the light receiving arrays PI1 correspond to an example of a third light receiving array.

In the present embodiment, since the one-dimensional pattern is exemplified as the absolute pattern, the light receiving arrays PA1 and PA2 corresponding thereto include the plurality of light receiving elements (for example, nine light receiving elements and an example of the first light receiving elements in the present embodiment) arranged in the measurement direction C (along the line Lcp) so as to receive the light reflected by the respective reflectors of the corresponding tracks SA1 and SA2. In the plurality of light receiving elements, as described above, each signal of received or non-received light is handled as a bit, and the absolute positions of nine bits are represented. Accordingly, the signals of light received by the respective plurality of light receiving elements are handled independently of one another at the position data generator 130, and the absolute positions encrypted (coded) into a serial bit pattern are decoded from a combination of these received light signals. The received light signals of the light receiving arrays PA1 and PA2 are referred to as "absolute signals". Further, when the absolute pattern different from that of the present embodiment is used, the light receiving arrays PA1 and PA2 are configured corresponding to such a pattern.

The light receiving arrays PI1 and PI2 include the plurality of light receiving elements arranged in the measurement direction C (along the line Lcp) so as to receive the light reflected by the reflectors of the corresponding tracks SI1 and SI2. First, the light receiving array PI1 will be described as an example.

In the present embodiment, within one pitch (one pitch in the projected image, that is, ε×P1) of the incremental pattern of the track SI1, a set (indicated as "SET1" in FIG. 5) of four light receiving elements in total are arranged, and multiple sets of four light receiving elements are further arranged in the measurement direction C. Then, in the incremental pattern, the reflector is repeatedly formed at every pitch. Thus, when the disk 110 is rotated, each of the light receiving elements generates a periodic signal of one period (referred to 360° in terms of electric angle) at one pitch. Then, since the four light receiving elements are arranged within one set corresponding to one pitch, the light receiving elements adjacent to each other within one set detect periodic signals having a phase difference of 90° from each other. These received light signals are respectively referred to as an A-phase signal, a B-phase signal (phase difference from the A-phase signal is 90°), an inverted A-phase signal (phase difference from the A-phase signal is 180°), and an inverted B-phase signal (phase difference from the B-phase signal is 180°).

Since the incremental pattern represents a position in one pitch, the signal of each phase in one set and the signal of each phase in another set corresponding thereto have values that change in the same manner. Accordingly, the signals of the same phase are added over a plurality of sets. Therefore, four signals having the phase shifted by 90° are detected from a number of light receiving elements of the light receiving array PI1 illustrated in FIG. 5.

On the other hand, the light receiving array PI2 is also configured as in the light receiving array PI1. That is, in one pitch (one pitch in the projected image, that is, ε×P2) of the incremental pattern of the track SI2, a set (indicated as "SET2" in FIG. 5) including a total of four light receiving elements are arranged, and several sets of four light receiving elements are arranged along the measurement direction C. Therefore, four signals having the phase shifted by 90° are respectively generated from the light receiving arrays PI1 and PI2. These four signals are referred to as an "incremental signal". In addition, an incremental signal generated by the light receiving array PI2 corresponding to the track SI2 having a short pitch has high resolution compared to another incremental signal, which is referred to as a "high-incremental signal", whereas an incremental signal generated by the light receiving array PI1 corresponding to the track SI1 having a long pitch has low resolution compared to another incremental signal, which is referred to as a "low-incremental signal".

In this embodiment, the case where four light receiving elements are included in one set corresponding to one pitch of the incremental pattern is described as an example, but, for example, two light receiving elements are included in one set. Therefore, the number of light receiving elements in one set is not limited in particular.

As described above, from the nature that the bit patterns by the detection or non-detection of each of the plurality of light receiving elements uniquely represents the absolute position in the light receiving arrays PA1 and PA2, when the amount of light received at the light receiving arrays PA1 and PA2 varies, an error detection of the absolute position is likely to occur. Accordingly, it is preferable that the amount of received light at the light receiving arrays PA1 and PA2 be uniform. However, the amount of light in the light source 121 may vary with aged deterioration. Particularly, for example, when an LED is used as the light source 121, there is a property that the amount of light in the light source 121 varies due to a temperature change. In this embodiment, as illustrated in FIG. 5, the optical module 120 can have two light amount adjusting light-receiving element PD (corresponding to an example of a second light receiving element) for adjusting the light received at the light receiving arrays PA1 and PA2. Based on the amount (amplitude of signal) of light received at the light amount adjusting light-receiving element PD, a current control circuit (not illustrated) of the light source 121 allows the current to the light source 121 to be increased when the amount of light received at the light amount adjusting light-receiving element PD is reduced and the current to the light source 121 to be reduced when the amount of light received at the light amount adjusting light-receiving element PD is increased, and thus the amount of light received at light receiving arrays PA1 and PA2 can be made substantially constant.

Two light amount adjusting light-receiving elements PDs are arranged at both sides of the light receiving array PI1 in the measurement direction C. That is, the light amount adjusting light-receiving elements PDs are configured to receive the light reflected at the track SI1 as a track corresponding to the light receiving array PI1. Then, the light amount adjusting light-receiving elements PDs are formed such that the length thereof in the measurement direction C is an integer multiple of one pitch (one pitch in the projected image, that is, ε×P1) of the incremental pattern of the track SI1. Thus, the amount of light received at the light amount adjusting light-receiving elements PDs is made substantially constant, and thus the signals of the light amount adjusting light-receiving elements PDs can be used to adjust the amount of light received at light receiving arrays PA1 and PA2. Further, with respect to each of two light amount adjusting light-receiving elements PDs, the length thereof in the measurement direction C may be set as an integer multiple of the pitch, and the total length of two light amount adjusting light-receiving elements PDs in the measurement direction C may be set as an integer multiple of the pitch.

Furthermore, in this embodiment, two light amount adjusting light-receiving elements PDs are arranged at both sides of the light receiving array PI1, but a single light amount adjusting light-receiving element PD may be arranged at one side of the light receiving array PI1. In addition, the light amount adjusting light-receiving elements PDs need not necessarily be the same track as in the light receiving array PI1, and may be arranged so as to be the same track as in the light receiving array PI2. In this case, the light amount adjusting light-receiving elements PDs are formed such that the length thereof in the measurement direction C is an integer multiple of one pitch (one pitch in the projected image, that is, ε×P2) of the incremental pattern of the track SI2.

(2-3. Position Data Generator)

From the optical module 120, the position data generator 130 acquires two absolute signals, which each includes the bit pattern representing the absolute position, and the high incremental signal and low incremental signal, which include four signals having the phase shifted by 90°, at a timing to measure the absolute position of the motor M. Then, the position data generator 130 calculates the absolute position of the motor M represented by these signals based on the acquired signals and outputs position data representing the calculated absolute position to the controller CT.

As a method for generating position data by the position data generator 130, various methods can be used and not limited in particular. Here, a case is described as an example, which generates the position data by calculating the absolute position from the high incremental signal and low incremental signal and the absolute signal.

Figure 6:
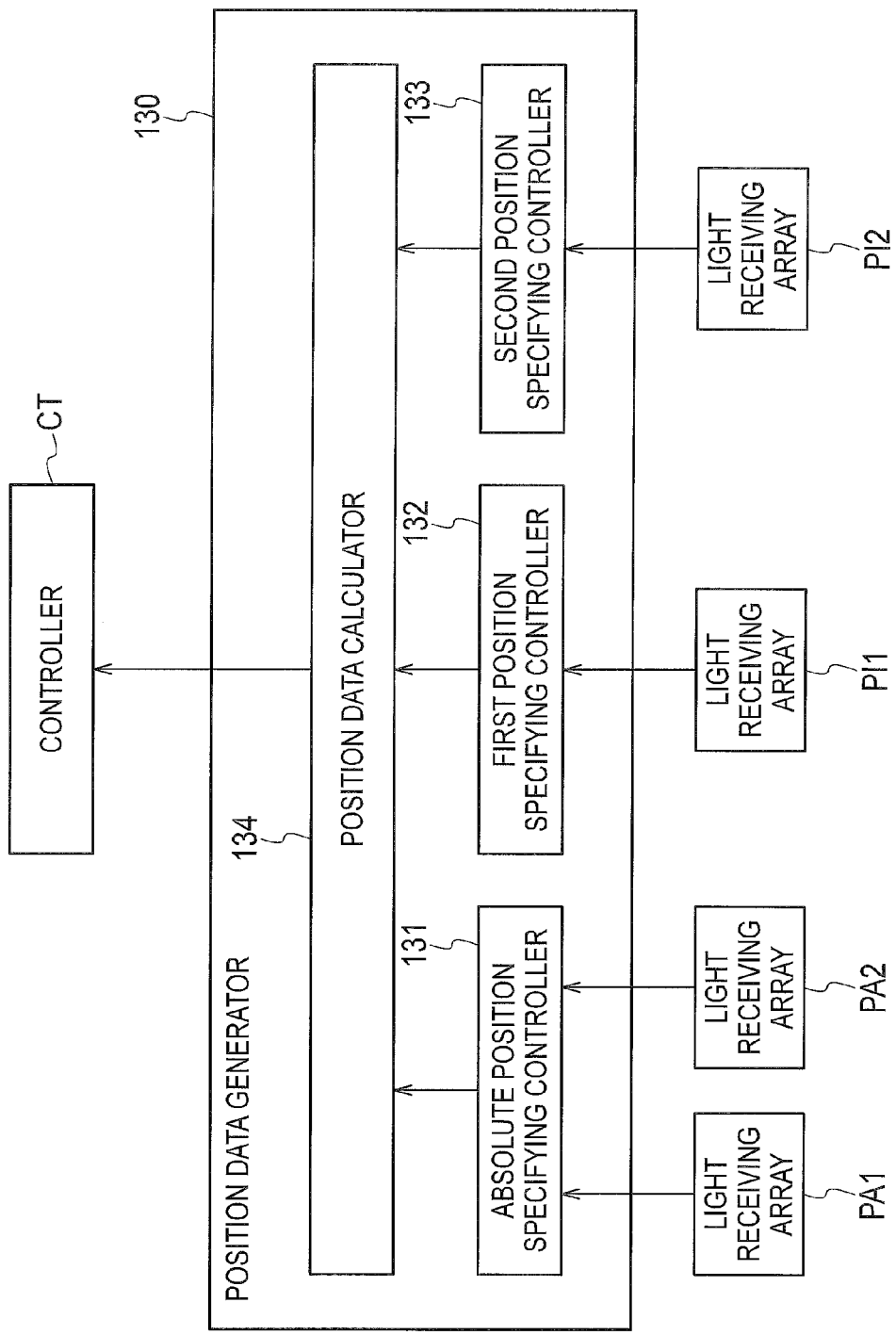
FIG. 6 is an explanatory diagram illustrating a position data generator according to the embodiment.

As illustrated in FIG. 6, the position data generator 130 includes an absolute position specifying portion 131, a first position specifying portion 132, a second position specifying portion 133, and a position data calculator 134. The absolute position specifying portion 131 binarizes each of the absolute signals from the light receiving arrays PA1 and PA2 and converts the signal into bit data representing the absolute position. Then, the position data generator 130 specifies the absolute position based on the correspondence relation between predetermined bit data and the absolute position.

Meanwhile, the first position specifying portion 132 performs subtraction on the low incremental signals, between which the phase difference is 180°, among the low incremental signals respectively having four phases from the light receiving array PI1. By performing the subtraction on the signals between which the phase difference is 180°, it is possible to cancel out manufacture errors, measurement errors or the like of the reflector in one pitch. As described above, the signals resulting from the subtraction are referred herein to as a "first incremental signal" and a "second incremental signal". The first incremental signal and the second incremental signal have a phase difference of 90° from each other in terms of an electric angle (simply referred to as "A-phase signal," "B-phase signal," and the like). Then, the first position specifying portion 132 specifies a position within one pitch from the two signals. A method for specifying the position within one pitch is not limited in particular. For example, when the low incremental signal, which is a periodic signal, is a sine-wave signal, as an example of the above-mentioned method, there is a method for calculating an electric angle φ by performing an arctangent operation on the result of division of two sine-wave signals in the A phase and B phase. Further, there is also a method for converting two sine-wave signals into an electric angle φ using a tracking circuit, as an example of the above-mentioned method. Alternatively, there is also a method for specifying an electric angle φ associated with values of signals in the A phase and B phase in a table prepared in advance, as an example of the above-mentioned method. At this time, the first position specifying portion 132 preferably performs an analog-digital conversion on two sine-wave signals in the A phase and B phase for each detection signal.

The position data calculator 134 superposes the position within one pitch specified by the first position specifying portion 132 on the absolute position specified by the absolute position specifying portion 131. Thus, it is possible to calculate the absolute position having the resolution higher than that of the absolute position based on the absolute signal. In this embodiment, the resolution of the calculated absolute position coincides with the number of reflectors of the track SI2 having a short pitch. That is, in this example, the resolution of the calculated absolute position is twice as higher as the resolution of the absolute position based on the absolute signal.

Meanwhile, the second position specifying portion 133 performs on the high incremental signal from the light receiving array PI2 in the same processing as in the above-described first position specifying portion 132 and specifies a position of high accuracy within one pitch from two signals. Then, the position data calculator 134 superposes the position within one pitch specified by the second position specifying portion 133 on the absolute position calculated based on the above-described low incremental signal. Thus, it is possible to calculate the absolute position having the resolution further higher than that of the absolute position calculated based on the low incremental signal.

The position data calculator 134 performs multiplication processing on the absolute position calculated in the above manner to further improve the resolution and then outputs it to the controller CT in the form of position data representing the absolute position of high accuracy. As described above, the method for specifying the absolute position having high resolution from a plurality of position data, which have different resolutions from each other, is referred to as an "accumulation method".

<3. Examples of Effects According to Present Embodiment>

In this embodiment, the plurality of tracks include the track SI2 having one incremental pattern and the track SI1 having the incremental pattern of the pitch longer than that of the other incremental pattern, and the light receiving array PI1 is configured to receive the light reflected at the track SI1 of the longer pitch. That is, the encoder 100 includes the plurality of tracks SI1 and SI2 each having the incremental patterns in which the pitch is different from each other and includes the plurality of light receiving arrays PI1 and PI2 configured to receive the light. Accordingly, it is possible to generate the position data representing the absolute position of the high resolution using a multiplication-accumulation method for accumulating the multiplication processing of the signal of the light receiving array PI1 and the multiplication processing of the signal of the light receiving array PI2, thereby realizing the high resolution.

Figure 7:
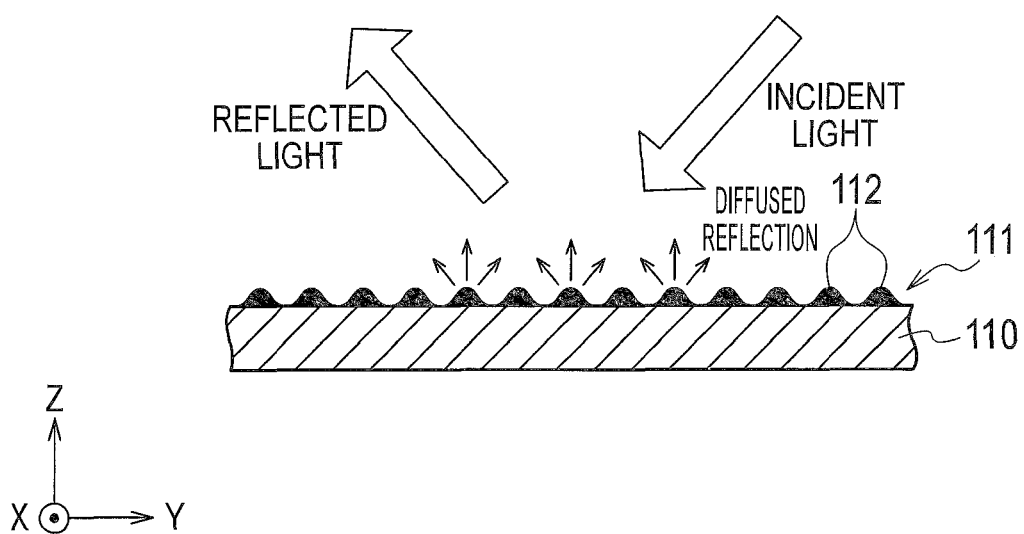
FIG. 7 is an explanatory diagram illustrating a diffused reflection due to recess/protrusion portions on the surface of the disk according to the embodiment.

In this embodiment, particularly, the following effects are obtained. As illustrated in FIG. 7, numerous fine recess/protrusion portions exist on a material 111 of the disk 110, and the diffused reflection (scattering) of the light emitted from the light source 121 occurs due to these concavo-convex portions at the time of the reflection on the disk 110.

Figure 8:
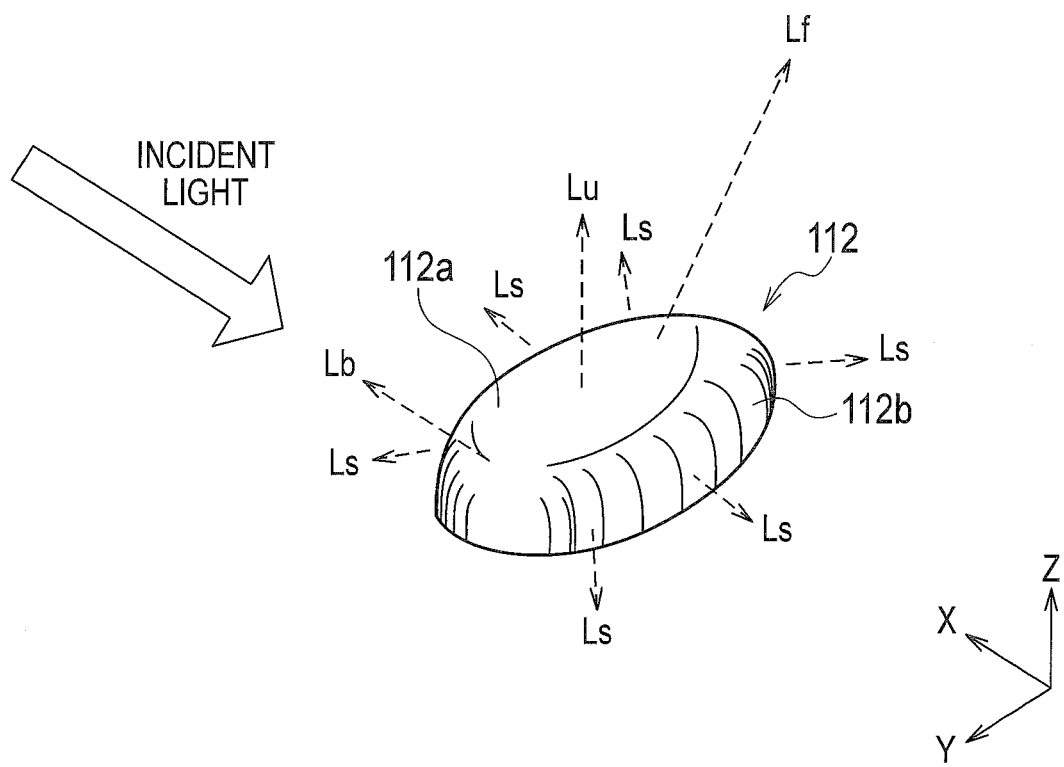
FIG. 8 is an explanatory diagram illustrating directivity of diffused reflection components due to the protrusion portions.

FIG. 8 conceptually illustrates a shape of a protrusion portion 112 in the fine recess/protrusion portions of the material 111, as an example. In FIG. 8, a length of each arrow in the diffused reflection components indicates a magnitude of intensity. In an example illustrated in FIG. 8, the protrusion portion 112 includes a top surface 112a and an inclined side surface 112b surrounding a circumference of the top surface 112a. Since the top surface 112a has a relatively flat shape, an irradiation area of incident light from an obliquely upper side (a positive direction side in the Y-axis direction and a positive direction side in the Z-axis direction in this example) is large. However, since the side surface 112b is inclined, the irradiation area of the incident light is small. For this reason, with respect to the intensity of the diffused reflection component occurring due to the incident light, as illustrated in FIG. 8, a forward scattering component Lf, an upward scattering component Lu, and a backward scattering component Lb are relatively large, which are scattered by the top surface 112a, but a sideward scattering component Ls becomes relatively small, which is scattered in a circumferential direction by the side surface 112b. In addition, among the forward scattering component Lf, the upward scattering component Lu, and the backward scattering component Lb, the forward scattering component Lf to be scattered in a regular reflection direction is greatest in intensity, and the upward scattering component Lu to be scattered in an upward direction and the backward scattering component Lb to be scattered in a reverse direction to the advancing direction of the incident light have about intermediate intensity (larger than that of the sideward scattering component Ls). Accordingly, the diffused reflection components are dominantly distributed as a whole in a direction along a Y-Z plane.

Figure 9:
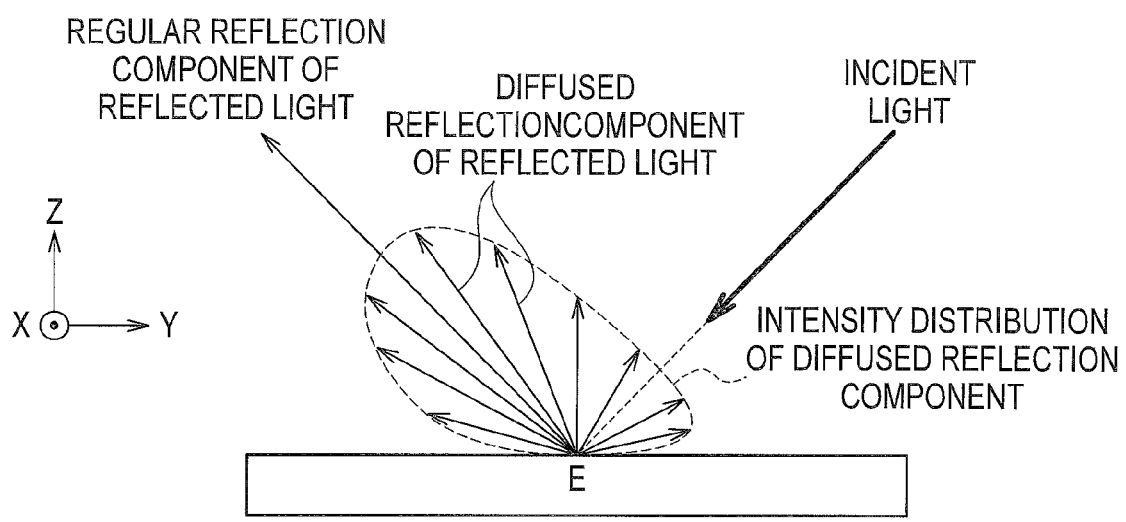
FIG. 9 is an explanatory diagram illustrating an intensity distribution of the diffused reflection components when viewed from an X-axis positive direction side.
Figure 10:
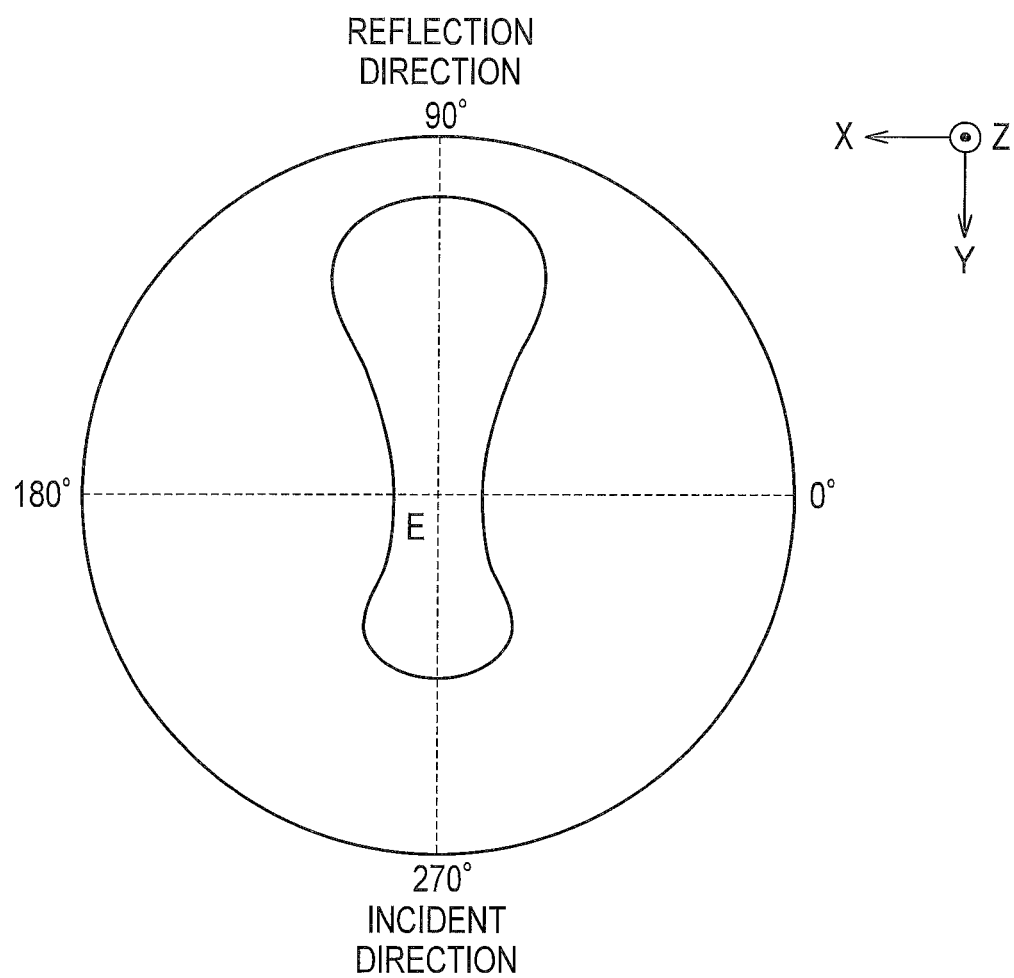
FIG. 10 is an explanatory diagram illustrating an intensity distribution of the diffused reflection components when viewed from a Z-axis positive direction side.

FIG. 9 illustrates intensity distribution of the diffused reflection components when viewed from the X-axis positive direction side, and FIG. 10 illustrates intensity distribution of the diffused reflection components when viewed from the Z-axis positive direction side. In FIG. 9, a length of each arrow indicates a magnitude of intensity. In FIG. 10, a distance from a point E indicates a magnitude of intensity. As illustrated in FIGS. 9 and 10, due to the diffused reflection by the above-described protrusion portions 112, the intensity of the diffused reflection components on the top surface of the disk 110, in which numerous fine protrusion portions 112 exist, is distributed in a long shape in a direction along a plane (Y-Z plane in this example) including the advancing direction of the light and is distributed to have directivity as a whole in the Y-axis direction. More specifically, as illustrated in FIG. 10, the intensity of the diffused reflection components is distributed substantially in a shape of "8" in which two circles arranged in the advancing direction of the light are connected to each other around a reflection position E and is particularly distributed so that a circular shape at a far side in the advancing direction of the light is larger than that at a near side in the advancing direction of the light. That is, when two light receiving arrays are arranged in the same direction relative to the light source 121 in the optical module 120, crosstalk occurs between both of the light receiving arrays, for example, the scattering light in the reflected light to be arrived at one light receiving array is arrived at the other light receiving array, which may cause noise. Then, the light receiving array apart from the light source 121 receives the diffused reflection component of both rays of light much more than the receiving array closer to the light source 121, and thus a larger noise may occur.

Meanwhile, since the signal of the light receiving array PI2 ultimately determines the resolution of the encoder 100, the noise preferably rides on the light receiving array PI2 to be minimized as much as possible. In this embodiment, the light receiving array PI2 is arranged between the light source 121 and one of the light receiving arrays PA1 and PA2 (light-receiving array PA2 in the above embodiment). Thus, based on the intensity distribution of the diffused reflection components of the light described above, it is possible to reduce the diffused reflection component to the light receiving array PI2 from the light receiving array PA2 and suppress the riding of the noise on the light receiving array PI2.

Furthermore, in this embodiment, the light receiving array PI2 is arranged between the light source 121 and the light receiving array PA2 and the light receiving array PI1 is arranged between the light source 121 and one of the light receiving arrays PA1 and PA2 (light receiving array PA1 in the above embodiment). That is, the light receiving arrays PI1 and PI2 are respectively arranged across the light source 121 on the opposite side in the width direction R. Thus, based on the intensity distribution of the diffused reflection components of the light described above, it is possible to reduce the diffused reflection component to the light receiving array PI2 from the light receiving array PI1 and suppress the riding of the noise on the light receiving array PI2. As a result, it is possible to improve reliability of the encoder 100.

Furthermore, in this embodiment, the light receiving array PI2 is arranged between the light source 121 and the light receiving array PA2 and the light receiving array PI1 is arranged between the light source 121 and the light receiving arrays PA1. That is, the light receiving arrays PI1 and PI2 are respectively arranged across the light source 121 on the opposite side in the width direction R. Thus, the light receiving arrays PI1 and PI2 can be arranged so as to be substantially symmetrical to each other with the light source 121 sandwiched therebetween. As a result, when the optical module 120 is arranged by a position misalignment in the rotational direction centering the light source 121 and the disk 110 is eccentrically installed with respect to the shaft SH, the phase of one signal of the light receiving arrays PI1 and PI2 advances and the phase of the other signal of the light receiving arrays PI1 and PI2 is delayed. Since the shift amounts of these phases are equal to each other, it is possible to correct the phase of the signal of two light receiving arrays PI1 and PI2 at the time of performing multiplication-accumulation processing. Accordingly, it is possible to prevent the accuracy of the position data from being reduced even when the position of the optical module 120 is shifted in the rotational direction or the disk 110 is eccentrically installed.

In this embodiment, the following effects are obtained in particular. As described above, in order to realize the higher resolution of the encoder 100 by accumulating the multiplication processing of the signal of the light receiving array PI1 and the multiplication processing of the signal of the light receiving array PI2, high-accuracy positioning of two light receiving arrays PI1 and PI2 is required to coincide the signal phases of two light receiving arrays PI1 and PI2 with each other.

In this embodiment, the light receiving array PI2 is arranged between the light source 121 and a light receiving array PA2, and the light receiving array PI1 is arranged between the light source 121 and the light receiving array PA1. That is, the light receiving arrays PI1 and PI2 are arranged inside two light receiving arrays PA1 and PA2. Thus, the light receiving array PI1 and the light receiving array PI2 can be arranged close to each other, and thus positional alignment is very easy at the time of forming two light receiving arrays PI1 and PI2 on the substrate BA or positioning the optical module 120 with respect to the disk 110, which can improve productivity of the encoder 100. In addition, as compared with the case of separately arranging two light receiving arrays PI1 and PI2, it is possible to reduce the influence due to the mechanical position misalignment by mounting errors (for example, eccentricity of the disk 110) or manufacturing errors and increase robustness against the mechanical position misalignment.

Furthermore, the following effects are particularly obtained in this embodiment. In general, as the light receiving array is arranged away from the light source 121, the amount of received light at the light source 121 is reduced. In the case of enlarging a light receiving area to ensure the amount of received light at the light source 121, a junction capacity of each light receiving element is increased, and thus responsiveness of the signal decreases. In addition, when the amount of received light at the light source 121 is reduced, the responsiveness of the signal similarly decreases even when a gain is increased at a circuit side.

As in this embodiment, in the case of accumulating the multiplication processing of the signals of the light receiving array PI1 and multiplication processing of the signals of the light receiving array PI2, the accuracy of the final absolute position of the encoder 100 is relatively greatly affected by the responsiveness of the signals output from the light receiving array PI2. Therefore, the arrangement position of the light receiving array PI2 is an important factor in improving the accuracy. In this embodiment, the light receiving array PI2 is arranged between the light source 121 and the light receiving array PA2. Thus, since light receiving array PI2 having a relatively large influence on the accuracy of the absolute position can be arranged close to the light source 121, the responsiveness can be improved. In addition, since the amount of light received in the light receiving array PI2, in which the accuracy is required, is increased, the accuracy of the absolute position can be improved.

Furthermore, the following effects are particularly obtained in this embodiment. In general, unlike the incremental signal, the absolute signal output by the light receiving arrays PA1 and PA2 corresponding to the tracks SA1 and SA2 having the absolute pattern is not a repeated signal (sine wave, and the like). Thus, it is difficult to reduce the noise, which occurs when the diffused reflection component of the light to be received at the light receiving arrays PA1 and PA2 is received at the light receiving array PI1 or PI2, using a filter. For this reason, the riding of the noise on the light receiving array PI1 or PI2 from the light receiving arrays PA1 and PA2 is preferably avoided as much as possible.

In this embodiment, the light receiving arrays PI1 and PI2 are arranged inside two light receiving arrays PA1 and PA2 corresponding to the absolute pattern. Thus, based on the intensity distribution of the diffused reflection components of the light described above, it is possible to suppress the riding of the noise on the light receiving array PI1 or PI2 from the light receiving arrays PA1 and PA2. In particularly, since the signal of the light receiving array PI2 ultimately determines the resolution of the encoder 100, it is possible to suppress the riding of the noise on the light receiving array PI2 and thus to improve the reliability of the encoder 100.

Furthermore, the following effects are particularly obtained in this embodiment. When an LED or the like is used as the light source 121, the light source 121 may have a light distribution characteristic in which the directivity is strong. In this case, the change in the amount of reflected light (light intensity) is relatively large in the vicinity area around the light source 121, but the change in the amount of reflected light is relatively small in the outside region. Then, the bit patterns by detection or non-detection of each of the plurality of light receiving elements uniquely represents the absolute position in two light receiving arrays PA1 and PA2 for outputting the absolute signal. From the nature of such signals, when the amount of light received at each light receiving element varies, erroneous detection of the absolute position is likely to occur. Thus, the amount of light received at each light receiving element is preferably uniform, and the light receiving arrays PA1 and PA2 is preferably arranged at a region in which the change in the amount of light is small.

In this embodiment, each of two light receiving arrays PA1 and PA2 corresponding to the absolute pattern is arranged such that the light receiving arrays PI1 and PI2 are respectively sandwiched between the light source 121 and each of the light receiving arrays PA1 and PA2. Thus, the light receiving arrays PA1 and PA2 are separated from the light source 121 and can be arranged at the above-described region in which the change in the amount of light is small. As a result, it is possible to improve the reliability of the absolute signal output by the light receiving arrays PA1 and PA2.

Furthermore, the following effects are particularly obtained in this embodiment. As described above, the absolute signal output by each of two light receiving arrays PA1 and PA2 allows the bit patterns by detection or non-detection of each of the plurality of light receiving elements to uniquely represent the absolute position. On the other hand, the incremental signal output by each of the light receiving arrays PI1 and PI2 represents the position within one pitch by the addition of the detection signal due to the plurality of light receiving elements in which the phases correspond to each other. From the nature of such signals, the light receiving arrays PI1 and PI2 have relatively high resistance to the noise by averaging of the noise, whereas the light receiving arrays PA1 and PA2 have relatively low resistance to the noise. Then, when the LED or the like is used as the light source 121, DC noise light without time variation occurs in the vicinity of the light source 121.

In this embodiment, each of two light receiving arrays PA1 and PA2 corresponding to the absolute pattern is arranged such that the light receiving arrays PI1 and PI2 are respectively sandwiched between the light source 121 and each of the light receiving arrays PA1 and PA2. Thus, the light receiving arrays PI1 and PI2 having the high resistance to the noise are arranged close to the light source 121, and the light receiving arrays PA1 and PA2 having the low resistance to the noise are arranged at the position away from the light source 121. As a result, it is possible to minimize the influence of the noise due to the above DC noise light.

Furthermore, the following effects are particularly obtained in this embodiment. In this embodiment, the higher resolution of the absolute position specified by the absolute signal output from the light receiving arrays PA1 and PA2 is achieved by the accumulation of the multiplication processing of the signal of the light receiving array PI1 and the multiplication processing of the signal of the light receiving array PI2. Thus, in order to performing the multiplication processing on the absolute position by the light receiving arrays PA1 and PA2 using the signal of the light receiving array PI1, the high-accuracy positioning of two light receiving arrays is required such that the signal phase of the light receiving arrays PA1 and PA2 outputting the absolute signal coincides with that of the light receiving array PI1.

In this embodiment, the light receiving array PI1 is arranged between the light source 121 and the light receiving array PA1. Thus, the light receiving array PA1 outputting the absolute signal can be arranged close to the light receiving array PI1, and thus the positional alignment is very easy at the time of forming two light receiving arrays PA1 and PI1 on the substrate BA or positioning the optical module 120 with respect to the disk 110, which can improve the productivity of the encoder 100. In addition, as compared with the case of separately arranging two light receiving arrays PA1 and PI1, it is possible to reduce the influence due to the mechanical position misalignment by the mounting errors (for example, eccentricity of the disk 110) or by the manufacturing errors and to increase the robustness against the mechanical position misalignment.

Furthermore, the following effects are particularly obtained in this embodiment. In general, there is a property that the detection error caused by the eccentricity of the disk 110 depends on a radius of the track. Accordingly, the error becomes larger when the radius is small, whereas the error becomes smaller when the radius is large.

In this embodiment, the light receiving array PI1 is arranged on a side closer to the central axis than the light receiving array PI2. That is, the light receiving array PI2 is arranged on the side (that is, outer circumferential side) opposite to the central axis relative to the light receiving array PI1, and the track SI2 having the short pitch (that is, having numerous reflectors) is arranged on the outer circumferential side of the disk 110, and thus the radius of the track SI2 can be enlarged. As a result, it is possible to reduce the detection error due to the eccentricity of the light receiving array PI2 and improve the robustness against the eccentricity. In addition, it is possible to ensure the large pitch of the track SI2 having numerous reflectors corresponding to the light receiving array PI2.

Furthermore, the following effects are particularly obtained in this embodiment. As described above, from the nature that the bit patterns by the detection or non-detection of each of the plurality of light receiving elements uniquely represents the absolute position in the light receiving arrays PA1 and PA2, when the amount of light received at the light receiving arrays PA1 and PA2 varies, an error detection of the absolute position is likely to occur. Accordingly, it is preferable that the amount of light received at the light receiving arrays PA1 and PA2 be uniform. However, when the LED or the like is used as the light source 121, there is a property that the amount of light of the LED varies due to a temperature change.

Here, in this embodiment, two light amount adjusting light-receiving elements PD are provided to adjust the amount of light received at the light receiving arrays PA1 and PA2. Based on the amount of received light (amplitude of signal) of the light amount adjusting light-receiving element PD, the current of the light source 121 is increased when the amount of received light of the light amount adjusting light-receiving element PD is reduced, whereas the current of the light source 121 is reduced when the amount of received light of the light amount adjusting light-receiving element PD is increased. Thus the amount of light received at light receiving arrays PA1 and PA2 can be made substantially constant. Accordingly, it is possible to improve the reliability of the signal of the light receiving arrays PA1 and PA2.

Furthermore, in this embodiment, two light amount adjusting light-receiving elements PDs are arranged at both sides of the light receiving array PI1 in the measurement direction C. That is, the light amount adjusting light-receiving elements PDs are configured so as to receive the light reflected at the same track as the track SI1 having the incremental pattern and corresponding to the light receiving array PI1. Even in this way, the amount of light received at the light amount adjusting light-receiving element PD can be made substantially constant by setting the width of the light amount adjusting light-receiving element PD in the measurement direction C to be an integer multiple of the arrangement pitch of each light receiving element in the light receiving array PI1, and thus the signal of the light amount adjusting light-receiving element PD can be used to adjust the amount of light received at the light receiving arrays PA1 and PA2. Therefore, since a track for adjusting the amount of light received at the light receiving arrays PA1 and PA2 is not necessary to be separately provided in the disk 110 and the optical module 120, it is possible to reduce the size of the encoder 100.

Furthermore, in this embodiment, since two light amount adjusting light-receiving elements PDs are provided, the degree of freedom in the arrangement configuration is improved compared to the case of the single light amount adjusting light-receiving element, and thus the degree of freedom of designing the optical module 120 can be improved. In addition, it is possible to further reduce the variation of the amount of light received in the light amount adjusting light-receiving elements PDs and improve the adjustment accuracy of the amount of received light by shifting the phases (for example, ½ pitch of each light receiving element in the light receiving array PI1, that is, $\epsilon \times P1 \times \frac{1}{2}$) of two light amount adjusting light-receiving elements PDs.

<4. Modified Example>

The embodiment has been described in detail with reference to the accompanied drawings as above. However, the scope of the technical idea disclosed in claims is not limited to the above-described embodiment. It is possible for persons having the ordinary knowledge in the field to which the embodiment of the invention belongs to further perform various changes, modifications, and combinations within the scope of the technical idea. Consequently, the techniques based on these changes, modifications, and combinations should naturally be regarded to belong to the scope of the technical idea of the invention.

For example, the case where two tracks SI1 and SI2 having an incremental pattern of different pitches are provided on the disk 110 is described in the embodiment described above, but three or more tracks having different pitches may be installed. In this case, it is also possible to realize high resolution using the accumulating method. For example, in this case, it is possible to use at least one of the light receiving arrays PA1 and PA2 for the incremental signal.

Figure 11:
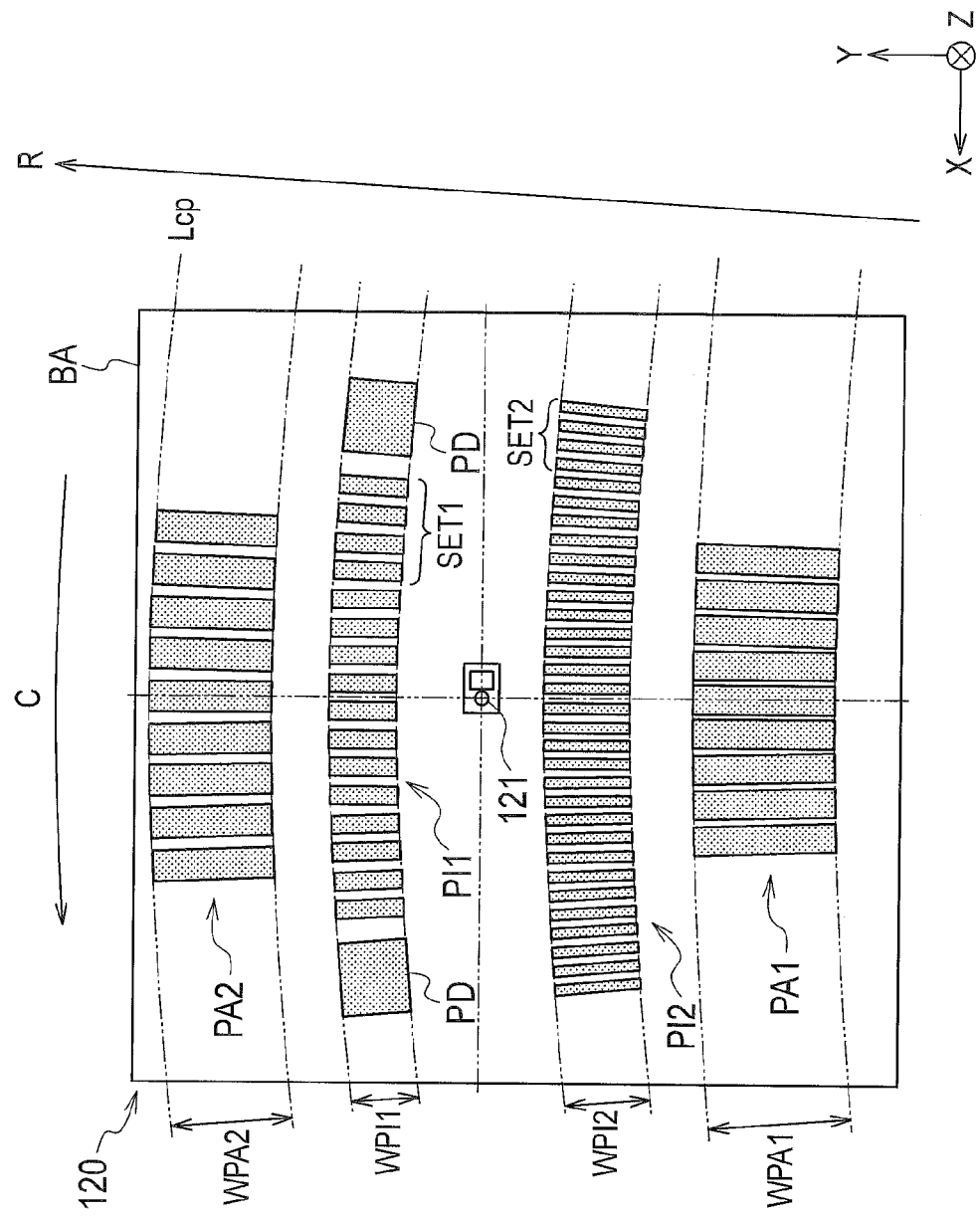
FIG. 11 is an explanatory diagram illustrating an optical module and a light receiving array according to a modified example.

Further, in the embodiment described above, the case is described where the light receiving array PI1 is arranged on the central axis side with respect to the light source 121, but as illustrated in FIG. 11, for example, the light receiving array PI1 may be arranged on the side (outer circumferential side) opposite to the central axis with respect to the light source 121. Even though not illustrated, in this case, four tracks are arranged from inside to outside in the width direction R in order of SA1, SI2, SI1, and SA2 on the disk 110. It is preferable that the configuration of the embodiment described above be used in the case of increasing the robustness against the eccentricity of the high incremental signal and the configuration of the modified example is used in the case of increasing the robustness against the eccentricity of the low incremental signal.

Furthermore, in the embodiment described above, the case is described where each of the light receiving arrays PA1 and PA2 has nine light receiving elements and the absolute signal represents the absolute position of nine bits, but the number of light receiving elements may be other than nine, and the number of bits of the absolute signal is also not limited to nine. In addition, the number of light receiving elements in the light receiving arrays PI1 and PI2 may be also not particularly limited to the number according to the embodiment described above.

In the embodiment described above, the case is described where the encoder 100 is directly connected to the motor M, but the encoder 100 may be connected to the motor M through other mechanisms such as a decelerator and rotation direction converter.

Furthermore, in the embodiment described above, the case is described where the light receiving arrays PA1 and PA2 are the light receiving arrays for the absolute signal, but is not limited thereto. For example, the light receiving arrays PA1 and PA2 may be a light receiving element group for the original point representing the original point position by the detection signal from each of the light receiving elements. In this case, the tracks SA1 and SA2 on the disk 110 are formed to have the pattern for the original point. Then, the bit pattern or intensity of the signals of the light received from the light receiving arrays PA1 and PA2 represents the original point position.

In the above description, meanings of "vertical", "parallel", and "equal" are not strictly applied. That is, the "vertical", "parallel", and "equal" mean "substantially vertical", "substantially parallel", and "substantially equal", respectively, in which a tolerance and an error in design or manufacturing can be allowed.

It should be understood by those skilled in the art that various modifications, combinations, sub-combinations and alterations may occur depending on design requirements and other factors insofar as they are within the scope of the appended claims or the equivalents thereof.

What is claimed is:

1. An encoder comprising:
tracks respectively having reflectors arranged along a measurement direction;
a point light source configured to emit diffusion light to the tracks;
one first light receiving array configured to receive light which is reflected at a track having an absolute pattern of said tracks and another first light receiving array configured to receive light which is reflected at a track having an absolute pattern of said tracks, wherein the one first light receiving array and the another first light receiving array are arranged across the point light source in a width direction substantially perpendicular to the measurement direction;
a second light receiving array arranged in the width direction between the one first light receiving array and the point light source, and configured to receive light which is reflected at a track having a first incremental pattern of said tracks; and
a third light receiving array arranged in the width direction between the another first light receiving array and the point light source, and configured to receive light which is reflected at a track having a second incremental pattern of said tracks, a pitch of which is longer than a pitch of the first incremental pattern.

2. The encoder according to claim 1, wherein
the measurement direction is a circumferential direction centering a central axis, and
the third light receiving any is arranged on a side closer to the central axis than the second light receiving array.

3. The encoder according to claim 1, further comprising:
two light amount adjusting light receiving elements configured to control an amount of light received at the one first light receiving array and the another first light receiving array, the two light amount adjusting light receiving elements being arranged on both sides of the third light receiving array in the measurement direction.

4. The encoder according to claim 2, further comprising;
two light amount adjusting light receiving elements configured to control an amount of light received at the one first light receiving array and the another first light receiving array, the two light amount adjusting receiving elements being arranged on both sides of the third light receiving array in the measurement direction.

5. A motor with an encoder comprising:
a linear motor in which a movable element moves with respect to an stator, or a rotary motor in which a rotor moves with respect to a stator; and
the encoder according to claim 1, configured to detect at least one of a position and a speed of the movable element or the rotor.

6. A motor with an encoder comprising:
a linear motor in which a movable element moves with respect to an stator, or a rotary motor in which a rotor moves with respect to a stator; and
the encoder according to claim 2, configured to detect at least one of a position and a speed of the movable element or the rotor.

7. A motor with an encoder comprising:
a linear motor in which a movable element moves with respect to an stator, or a rotary motor in which a rotor moves with respect to a stator; and
the encoder according to claim 3, configured to detect at least one of a position and a speed of the movable element or the rotor.

8. A motor with an encoder comprising:
a linear motor in which a movable element moves with respect to an stator, or a rotary motor in which a rotor moves with respect to a stator; and
the encoder according to claim 4, configured to detect at least one of a position and a speed of the movable element or the rotor.

9. A servo system comprising:
a linear motor in which a movable element moves with respect to an stator, or a rotary motor in which a rotor moves with respect to a stator;
an encoder according to claim 1, configured to detect at least one of a position and a speed of the movable element or the rotor; and
a controller configured to control the linear motor or the rotary motor based on a result detected by the encoder.

10. A servo system comprising:
a linear motor in which a movable element moves with respect to an stator, or a rotary motor in which a rotor moves with respect to a stator;
an encoder according to claim 2, configured to detect at least one of a position and a speed of the movable element or the rotor; and
a controller configured to control the linear motor or the rotary motor based on a result detected by the encoder.

11. A servo system comprising:
a linear motor in which a movable element moves with respect to an stator, or a rotary motor in which a rotor moves with respect to a stator;
an encoder according to claim 3, configured to detect at least one of a position and a speed of the movable element or the rotor; and
a controller configured to control the linear motor or the rotary motor based on a result detected by the encoder.

12. A servo system comprising:
a linear motor in which a movable element moves with respect to an stator, or a rotary motor in which a rotor moves with respect to a stator;
an encoder according to claim 4, configured to detect at least one of a position and a speed of the movable element or the rotor; and
a controller configured to control the linear motor or the rotary motor based on a result detected by the encoder.

* * * * *